United States Patent
Ito et al.

(10) Patent No.: US 12,492,149 B2
(45) Date of Patent: Dec. 9, 2025

(54) CERAMIC SINTERED BODY AND PLASMA-GENERATING ELECTRODE

(71) Applicant: Niterra Co., Ltd., Nagoya (JP)

(72) Inventors: Tsuneyuki Ito, Nagoya (JP); Shinji Ban, Nagoya (JP); Osamu Yoshimoto, Nagoya (JP); Tomoo Tanaka, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 19/013,139

(22) Filed: Jan. 8, 2025

(65) Prior Publication Data
US 2025/0230102 A1    Jul. 17, 2025

(30) Foreign Application Priority Data
Jan. 15, 2024   (JP) ................... 2024-003706

(51) Int. Cl.
*H01B 1/04* (2006.01)
*C04B 35/56* (2006.01)
*H01J 37/32* (2006.01)

(52) U.S. Cl.
CPC ...... *C04B 35/5626* (2013.01); *C04B 35/5607* (2013.01); *C04B 35/5622* (2013.01); *H01B 1/04* (2013.01); *H01J 37/3255* (2013.01); *C04B 2235/3217* (2013.01); *C04B 2235/3246* (2013.01); *C04B 2235/3839* (2013.01);
(Continued)

(58) Field of Classification Search
CPC .. H01B 1/00; H01B 1/04; H01B 1/06; H01M 4/62; H01M 10/056; C04B 35/56; C04B 35/5607; C04B 35/5622; C04B 35/5626; H05H 1/24
See application file for complete search history.

(56) References Cited

U.S. PATENT DOCUMENTS

| | | | |
|---|---|---|---|
| 10,087,517 B2 * | 10/2018 | Miyanaga | ............... C23C 14/34 |
| 11,230,502 B2 * | 1/2022 | Yagi | ..................... C04B 35/443 |
| 11,434,174 B2 * | 9/2022 | Ikeda | .................. C04B 35/5626 |

FOREIGN PATENT DOCUMENTS

JP      6929755 B2    9/2021

OTHER PUBLICATIONS

Liu et al "Formation of solid solution structures in (Ti,W, Ta, Mo)(C, N) cermet via spark plasma sintering", International Journal of Refractory Metals and Hard Materials 113 (2023) 10621.*
(Continued)

*Primary Examiner* — Mark Kopec
(74) *Attorney, Agent, or Firm* — Sughrue Mion, PLLC (57) ABSTRACT

A ceramic sintered body contains a first particular element consisting of five or six elements selected from among titanium (Ti), vanadium (V), zirconium (Zr), niobium (Nb), molybdenum (Mo), hafnium (Hf), tantalum (Ta), and tungsten (W); a second particular element consisting of one element selected from yttrium (Y) and aluminum (Al); and elemental carbon (C). The total amount of the first particular element, the second particular element, and elemental carbon is 98 at % or more. The ceramic sintered body has a plurality of microstructures having respective compositions different from one another. One of the plurality of microstructures includes a solid solution containing at least three members of the first particular element.

12 Claims, 8 Drawing Sheets

(52) U.S. Cl.
CPC ............... *C04B 2235/3843* (2013.01); *C04B 2235/3847* (2013.01); *C04B 2235/80* (2013.01)

(56) References Cited

OTHER PUBLICATIONS

Monteverde et al "Compositional disorder and sintering of entropy stabilized (Hf, Nb, Ta, Ti, Zr) B2 solid solution powders", Journal of the European Ceramic Society 40 (2020) 3807-3814.*

* cited by examiner

| | MAIN RAW MATERIAL (mol%) | | | | | | | | ADDITIVE (wt%) | | FIRING CONDITIONS | | |
|---|---|---|---|---|---|---|---|---|---|---|---|---|---|
| | TiC | VC | ZrC | NbC | Mo2C | HfC | TaC | WC | 3YSZ | Al2O3 | FIRING METHOD | TEMPERATURE (°C) | PRESSURE (MPa) |
| SAMPLE1 | 0 | 20 | 20 | 20 | 0 | 0 | 20 | 20 | 0.4 | 0 | HP | 1800 | 60 |
| SAMPLE2 | 0 | 20 | 20 | 0 | 0 | 20 | 20 | 20 | 0.4 | 0 | HP | 1800 | 60 |
| SAMPLE3 | 0 | 20 | 20 | 20 | 0 | 20 | 0 | 20 | 0.4 | 0 | HP | 1800 | 60 |
| SAMPLE4 | 20 | 0 | 20 | 20 | 0 | 0 | 20 | 20 | 0.4 | 0 | HP | 1800 | 60 |
| SAMPLE5 | 0 | 20 | 20 | 20 | 0 | 20 | 20 | 0 | 0.4 | 0 | HP | 1800 | 60 |
| SAMPLE6 | 20 | 20 | 20 | 0 | 0 | 0 | 20 | 20 | 0.4 | 0 | HP | 1800 | 60 |
| SAMPLE7 | 20 | 20 | 20 | 0 | 0 | 20 | 0 | 20 | 0.4 | 0 | HP | 1800 | 60 |
| SAMPLE8 | 20 | 20 | 20 | 20 | 0 | 0 | 0 | 20 | 0.4 | 0 | HP | 1800 | 60 |
| SAMPLE9 | 20 | 20 | 20 | 20 | 0 | 0 | 20 | 0 | 0.4 | 0 | HP | 1800 | 60 |
| SAMPLE10 | 20 | 20 | 20 | 20 | 12 | 0 | 0 | 0 | 0.4 | 0 | HP | 1800 | 60 |
| SAMPLE11 | 0 | 22 | 22 | 0 | 12 | 0 | 22 | 22 | 0.4 | 0 | HP | 1800 | 60 |
| SAMPLE12 | 0 | 22 | 22 | 0 | 12 | 22 | 0 | 22 | 0.4 | 0 | HP | 1800 | 60 |

FIG. 4

| | MAIN RAW MATERIAL (mol%) | | | | | | | | ADDITIVE (wt%) | | FIRING CONDITIONS | | |
|---|---|---|---|---|---|---|---|---|---|---|---|---|---|
| | TiC | VC | ZrC | NbC | Mo₂C | HfC | TaC | WC | 3YSZ | Al₂O₃ | FIRING METHOD | TEMPERATURE (°C) | PRESSURE (MPa) |
| SAMPLE13 | 0 | 0 | 22 | 22 | 12 | 22 | 0 | 22 | 0.4 | 0 | HP | 1800 | 60 |
| SAMPLE14 | 17 | 17 | 16 | 16 | 0 | 0 | 17 | 17 | 0.4 | 0 | HP | 1800 | 60 |
| SAMPLE15 | 17 | 17 | 16 | 16 | 0 | 17 | 0 | 17 | 0.4 | 0 | HP | 1800 | 60 |
| SAMPLE16 | 18 | 18 | 18 | 18 | 10 | 0 | 0 | 18 | 0.4 | 0 | HP | 1800 | 60 |
| SAMPLE17 | 0 | 20 | 20 | 20 | 0 | 0 | 20 | 20 | 10.0 | 0 | HP | 1800 | 60 |
| SAMPLE18 | 0 | 20 | 20 | 20 | 0 | 0 | 20 | 20 | 0.0 | 0.2 | HP | 1800 | 60 |
| SAMPLE19 | ZrO₂, Ta₂O₅, Nb₂O₅, V₂O₅, WO₃ | | | | | | | | 0.4 | 0 | HP | 1800 | 60 |
| SAMPLE20 | 0 | 20 | 20 | 20 | 0 | 0 | 20 | 20 | 15.0 | 0 | HP | 1800 | 60 |
| SAMPLE21 | 0 | 20 | 20 | 20 | 0 | 0 | 20 | 20 | 0.0 | 0.3 | HP | 1800 | 60 |
| SAMPLE22 | 0 | 0 | 0 | 0 | 0 | 100 | 0 | 0 | 0.0 | 0 | SPS | 1900 | 70 |
| SAMPLE23 | 0 | 0 | 33 | 0 | 0 | 33 | 0 | 33 | 0.4 | 0 | HP | 1800 | 60 |

FIG. 5

| | FIRST MICROSTRUCTURE | | SECOND MICROSTRUCTURE | | | | THIRD MICROSTRUCTURE | | |
|---|---|---|---|---|---|---|---|---|---|
| | COMPOSITION | GRAIN SIZE (μm) | RATIO (%) | COMPOSITION | GRAIN SIZE (μm) | RATIO (%) | SPINODAL DECOMPOSITION | COMPOSITION | GRAIN SIZE (μm) | RATIO (%) |
| SAMPLE1 | (ZrTaNbVW)C | 10.4 | 88 | (ZrNb)C | 2.9 | 12 | NO | NO | — | — |
| SAMPLE2 | (HfZrTaVW)C | 7.9 | 73 | (VW)C | 7.2 | 27 | YES | NO | — | — |
| SAMPLE3 | (HfZrNb)C | 3.8 | 66 | (VW)C | 1.3 | 34 | NO | NO | — | — |
| SAMPLE4 | (ZrTiTaNbW)C | 4.5 | 82 | (ZrNb)C | 1.8 | 12 | NO | TaC | 2.2 | 6 |
| SAMPLE5 | (HfTiNbVW)C | 11.2 | 91 | HfC | 0.8 | 9 | NO | NO | — | — |
| SAMPLE6 | (ZrTiTaVW)C | 12.1 | 89 | ZrC | 1.1 | 11 | NO | NO | — | — |
| SAMPLE7 | (TiVW)C | 4.2 | 64 | (HfZr)C | 2.8 | 36 | NO | NO | — | — |
| SAMPLE8 | (ZrTiNbVW)C | 7.4 | 65 | (TiVW)C | 6.7 | 29 | YES | (ZrNb)C | 1.0 | 6 |
| SAMPLE9 | (ZrTiTaNbV)C | 7.5 | 79 | (ZrNb)C | 3.4 | 12 | NO | TaC | 5.2 | 9 |
| SAMPLE10 | (HfZrTiNb)C | 4.1 | 64 | (TiV)C | 1.2 | 36 | NO | NO | — | — |
| SAMPLE11 | (TaZrWMo)C | 6.9 | 52 | (VWMo)C | 6.8 | 42 | YES | ZrC | 1.1 | 6 |
| SAMPLE12 | (VWMo)C | 3.2 | 63 | (HfZr)C | 2.5 | 37 | NO | NO | — | — |

FIG. 6

| | FIRST MICROSTRUCTURE | | | SECOND MICROSTRUCTURE | | | | THIRD MICROSTRUCTURE | | |
|---|---|---|---|---|---|---|---|---|---|---|
| | COMPOSITION | GRAIN SIZE (μm) | RATIO (%) | COMPO-SITION | GRAIN SIZE (μm) | RATIO (%) | SPINODAL DECOM-POSITION | COMPO-SITION | GRAIN SIZE (μm) | RATIO (%) |
| SAMPLE13 | (HfZrNbMo)C | 6.3 | 68 | (WMo)C | 3.6 | 32 | NO | NO | — | — |
| SAMPLE14 | (ZrTiTaNbVW)C | 9.8 | 86 | (ZrNb)C | 2.1 | 14 | NO | NO | — | — |
| SAMPLE15 | (ZrNbVW)C | 6.4 | 62 | (TiVW)C | 5.7 | 28 | YES | (HfZr)C | 1.3 | 10 |
| SAMPLE16 | (TiNbVWMo)C | 5.6 | 59 | (TiVW)C | 4.8 | 32 | YES | (ZrNb)C | 1.1 | 9 |
| SAMPLE17 | (ZrTaNbVW)C | 11.2 | 87 | (ZrNb)C | 3.1 | 13 | NO | NO | — | — |
| SAMPLE18 | (ZrTaNbVW)C | 10.8 | 89 | (ZrNb)C | 2.6 | 11 | NO | NO | — | — |
| SAMPLE19 | (ZrTaNbVW)C | 10.4 | 85 | (ZrNb)C | 2.9 | 15 | NO | NO | — | — |
| SAMPLE20 | (ZrTaNbVW)C | 10.4 | 84 | (ZrNb)C | 2.9 | 16 | NO | NO | — | — |
| SAMPLE21 | (ZrTaNbVW)C | 8.9 | 87 | (ZrNb)C | 2.5 | 13 | NO | NO | — | — |
| SAMPLE22 | (ZrTaNbVW)C | 9.2 | 89 | (ZrNb)C | 3.1 | 11 | NO | NO | — | — |
| SAMPLE23 | HfC | 1.4 | 100 | NO | — | — | — | NO | — | — |
| SAMPLE24 | (HfZr)C | 3.2 | 68 | WC | 2.1 | 32 | NO | NO | — | — |

FIG. 7

| | Y CONC (atppm) | Al CONC (atppm) | Fe CONC (atppm) | C CONC (at%) | DIFFERENCE IN FIRST PARTICULAR ELEMENT ATOMIC CONCENTRATION (at%) | RELATIVE DENSITY (%) | STRENGTH (MPa) | ON-OFF DURABILITY | AMOUNT OF LOSS |
|---|---|---|---|---|---|---|---|---|---|
| SAMPLE1 | 108 | 0 | 709 | 48.8 | 1.27 | 96.9 | 583 | A | 32 |
| SAMPLE2 | 145 | 0 | 537 | 50.1 | 1.33 | 99.8 | 633 | A | 9 |
| SAMPLE3 | 133 | 0 | 743 | 52.1 | 0.67 | 98.2 | 712 | A | 30 |
| SAMPLE4 | 121 | 0 | 409 | 49.9 | 0.35 | 98.0 | 767 | A | 22 |
| SAMPLE5 | 125 | 0 | 743 | 50.4 | 1.11 | 97.6 | 556 | B | 39 |
| SAMPLE6 | 101 | 0 | 653 | 51.3 | 0.78 | 97.7 | 542 | B | 29 |
| SAMPLE7 | 101 | 0 | 687 | 49.6 | 0.91 | 96.1 | 754 | A | 31 |
| SAMPLE8 | 105 | 0 | 759 | 50.2 | 1.44 | 97.1 | 767 | A | 13 |
| SAMPLE9 | 114 | 0 | 824 | 51.1 | 2.01 | 97.5 | 751 | A | 42 |
| SAMPLE10 | 132 | 0 | 858 | 49.7 | 3.78 | 97.4 | 734 | A | 49 |
| SAMPLE11 | 124 | 0 | 625 | 50.7 | 0.59 | 95.4 | 759 | A | 14 |
| SAMPLE12 | 121 | 0 | 660 | 49.2 | 4.21 | 95.9 | 730 | A | 36 |

FIG. 8

| | Y CONC (atppm) | Al CONC (atppm) | Fe CONC (atppm) | C CONC (at%) | DIFFERENCE IN FIRST PARTICULAR ELEMENT ATOMIC CONCENTRATION (at%) | RELATIVE DENSITY (%) | STRENGTH (MPa) | ON-OFF DURA-BILITY | AMOUNT OF LOSS |
|---|---|---|---|---|---|---|---|---|---|
| SAMPLE13 | 109 | 0 | 408 | 51.5 | 1.66 | 99.6 | 662 | A | 25 |
| SAMPLE14 | 122 | 0 | 719 | 50.9 | 2.44 | 97.5 | 574 | A | 32 |
| SAMPLE15 | 145 | 0 | 748 | 51.2 | 1.17 | 96.8 | 769 | A | 12 |
| SAMPLE16 | 155 | 0 | 743 | 48.9 | 0.56 | 96.4 | 761 | A | 16 |
| SAMPLE17 | 2945 | 0 | 674 | 49.3 | 1.24 | 96.4 | 543 | B | 51 |
| SAMPLE18 | 0 | 2820 | 709 | 49.8 | 1.33 | 96.1 | 525 | B | 57 |
| SAMPLE19 | 150 | 0 | 925 | 57.6 | 5.11 | 95.1 | 394 | C | 88 |
| SAMPLE20 | 114 | 0 | 942 | 42.1 | 3.98 | 95.8 | 426 | C | 75 |
| SAMPLE21 | 4348 | 0 | 712 | 49.2 | 1.45 | 96.9 | 482 | C | 65 |
| SAMPLE22 | 0 | 3872 | 765 | 49.9 | 1.62 | 96.9 | 468 | C | 62 |
| SAMPLE23 | 0 | 0 | 103 | 0.0 | - | 95.6 | 342 | D | - |
| SAMPLE24 | 167 | 0 | 146 | 50.4 | 0.33 | 97.6 | 501 | C | 100 | ns
CERAMIC SINTERED BODY AND PLASMA-GENERATING ELECTRODE

BACKGROUND

1. Field of the Disclosure

The present disclosure relates to a ceramic sintered body and to an electrode for generating plasma (hereinafter referred to as a "plasma-generating electrode").

2. Description of Related Art

There has hitherto been known a ceramic sintered body for use in a plasma-generating electrode (see, for example, Patent Document 1).
Patent Document 1: Japanese Patent No. 6929755

However, even when a related technique as disclosed in Patent Document 1 is employed, there is an need for improving durability of a ceramic sintered body against thermal stress.

Thus, an object of the present disclosure is to provide techniques for improving durability of a ceramic sintered body to thermal stress.

BRIEF SUMMARY OF THE DISCLOSURE

The present disclosure has been accomplished in order to at least partially solve the aforementioned problem, and can be carried out in the following aspects.

In one aspect of the present disclosure, there is provided a ceramic sintered body. The ceramic sintered body contains a first particular element consisting of five or six elements selected from among titanium (Ti), vanadium (V), zirconium (Zr), niobium (Nb), molybdenum (Mo), hafnium (Hf), tantalum (Ta), and tungsten (W); a second particular element consisting of one element selected from yttrium (Y) and aluminum (Al); and elemental carbon (C). The total amount of the first particular element, the second particular element, and elemental carbon is 98 at % or more. The ceramic sintered body has a plurality of microstructures having respective compositions different from one another. One of the plurality of microstructures includes a solid solution containing at least three members of the first particular element.

According to this aspect, since the solid solution containing three or more first particular elements contains an element having a melting point lower than that of hafnium carbide, a dense ceramic sintered body can be fabricated through a technique, for example, of hot pressing, whereby the mechanical strength of the ceramic sintered body can be enhanced. As a result, durability to thermal stress can be enhanced.

In the ceramic sintered body of the above aspect, another one of the plurality of microstructures may undergo spinodal decomposition. Thus, electrical resistance between microstructures decreases, whereby heat generation of the ceramic sintered body can be suppressed. As a result, undesired loss of the ceramic sintered body due to heat generation can be suppressed.

In the ceramic sintered body of the above aspect, another one of the plurality of microstructures may include a solid solution containing at least two members of the first particular element. Thus, the density of the ceramic sintered body is further enhanced, whereby the mechanical strength of the ceramic sintered body can be further enhanced.

In the ceramic sintered body of the above aspect, the amount of the second particular element contained in the ceramic sintered body may be 3,000 atomic ppm (hereinafter denoted by "at. ppm") or less. Accordingly, provision of pores between microstructures is suppressed. Thus, the density of the ceramic sintered body is further enhanced, whereby the mechanical strength of the ceramic sintered body can be further enhanced.

In the ceramic sintered body of the above aspect, the amount of elemental carbon contained in the ceramic sintered body may be 45 at % or more and 55 at % or less. Accordingly, deposition of free carbon is suppressed, while deposition of a metallic phase of the first particular element is suppressed. As a result, the mechanical strength of the ceramic sintered body can be further enhanced.

In the ceramic sintered body of the above aspect, the amount of elemental iron (Fe) contained in the ceramic sintered body may be 800 at. ppm or less. Accordingly, deposition of iron-based grains is suppressed. Thus, melting of the ceramic sintered body due to a rise in temperature is suppressed, whereby undesired loss of the ceramic sintered body possibly due to heat generation can be further suppressed.

In another aspect of the present disclosure, a plasma-generating electrode is provided. The plasma-generating electrode has the ceramic sintered body of the aforementioned aspect. Accordingly, the plasma-generating electrode has a ceramic sintered body having the first microstructure which is a solid solution containing at least three members of the first particular element. Thus, durability of the plasma-generating electrode to thermal stress can be enhanced, whereby service life of the plasma-generating electrode can be prolonged.

Notably, the present disclosure can be realized in a variety of aspects. For example, the disclosure can be realized as a method for producing a ceramic sintered body, an apparatus having the ceramic sintered body, a method for regulating the apparatus having the ceramic sintered body, or the like.

Additional features and advantages of the present disclosure may be described further below. This summary section is meant merely to illustrate certain features of the disclosure, and is not meant to limit the scope of the disclosure in any way. The failure to discuss a specific feature or embodiment of the disclosure, or the inclusion of one or more features in this summary section, should not be construed to limit the claims.

BRIEF DESCRIPTION OF THE DRAWINGS

The figures contained herein are provided only by way of example and not by way of limitation.

DETAILED DESCRIPTION OF EXEMPLARY EMBODIMENTS OF THE DISCLOSURE

First Embodiment

Figure 1:
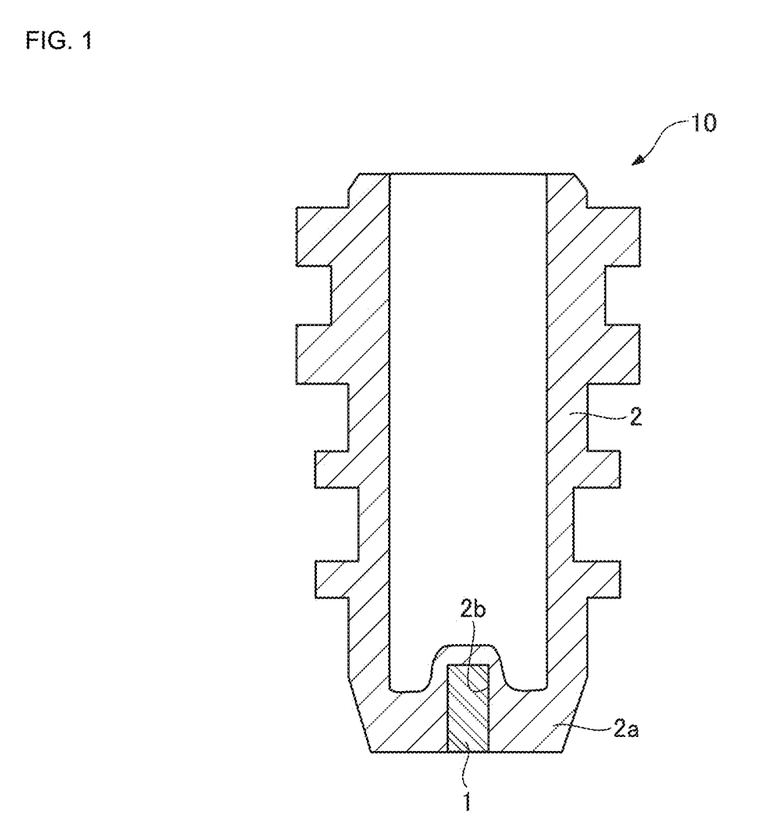
FIG. 1 is a cross-section of a plasma-generating electrode having a ceramic sintered body of a first embodiment.

FIG. 1 is a cross-section of a plasma-generating electrode 10 having an electrode tip 1 (ceramic sintered body) of the present embodiment. The plasma-generating electrode 10 of the present embodiment is employed for, for example, generating oxygen plasma, in an apparatus employing plasma such as a plasma cutting machine, a plasma surface-treatment device, or a plasma spraying device. The plasma-generating electrode 10 has the electrode tip 1 serving as a cathode for generating plasma, and a tip-supporting portion 2 for supporting the electrode tip 1.

The electrode tip 1 is formed of a ceramic sintered body and contains a first particular element consisting of five or six elements selected from among titanium (Ti), vanadium (V), zirconium (Zr), niobium (Nb), molybdenum (Mo), hafnium (Hf), tantalum (Ta), and tungsten (W); a second particular element consisting of one element selected from yttrium (Y) and aluminum (Al); and elemental carbon (C). The total amount of the first particular element, the second particular element, and elemental carbon, which are contained in the ceramic sintered body serving as the electrode tip 1, is 98 at % or more. The total amount of the first particular element, the second particular element, and elemental carbon may be 100 at %, and the amount of the second particular element is greater than 0 at. ppm. The electrode tip 1 contains the second particular element in an amount of 3,000 at. ppm or less and elemental carbon in an amount of 45 at % or more and 55 at % or less. The first particular element atomic concentration and the elemental carbon concentration of the electrode tip 1 are determined through energy dispersive X-ray spectrometry (EDS). The characterization of the second particular element present in the electrode tip 1, and determination of the second particular element atomic concentration are conducted by means of an inductively coupled plasma (ICP) optical emission spectrometer.

The ceramic sintered body serving as the electrode tip 1 has a plurality of microstructures having compositions different from one another. One of the plurality of microstructures, which are present in the ceramic sintered body serving as the electrode tip 1 of the present embodiment, includes a solid solution containing at least three members of the first particular element. Another one member of the plurality of microstructures includes a solid solution containing at least two members of the first particular element. Another one member of the plurality of microstructures, which is present in the ceramic sintered body serving as the electrode tip 1 of the present embodiment, has undergone spinodal decomposition.

Figure 2:
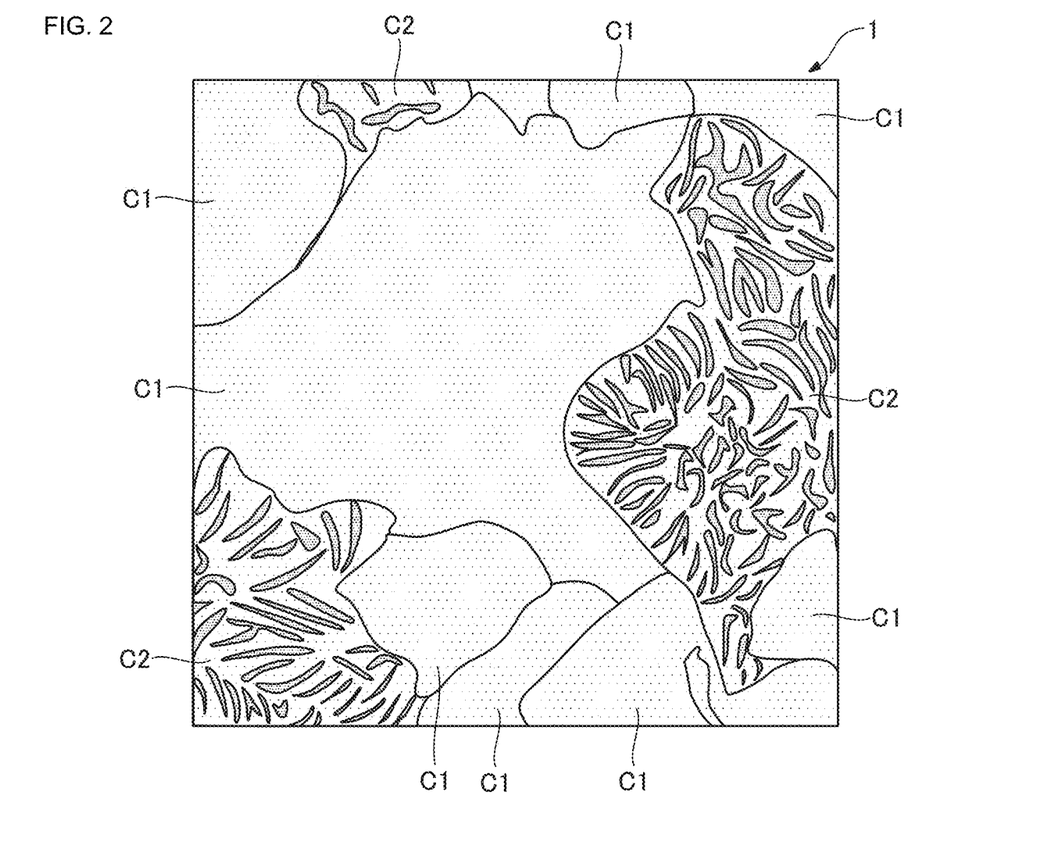
FIG. 2 is a cross-sectional SEM image of the ceramic sintered body of the first embodiment.

FIG. 2 is a cross-sectional SEM image of an example ceramic sintered body of the first embodiment. FIG. 2 is a schematic image obtained by imaging, under a scanning electron microscope (SEM), a cross-section of the electrode tip 1 after thermal etching. FIG. 2 shows a plurality of microstructures (crystal grains). Among the plurality of microstructures shown in FIG. 2, a first microstructure C1 assumes a solid solution containing at least three members of the first particular element. In the electrode tip 1, the first microstructure C1 is formed of crystal grains of a carbide represented by, in this example embodiment, a compositional formula (HfZrTaVW)C, containing hafnium, zirconium, tantalum, vanadium, and tungsten. In the first microstructure C1, the entirety of the microstructure forms a solid solution. The second microstructure C2 is formed of a solid solution containing two members of the first particular element. In the electrode tip 1, the second microstructure C2 is formed of crystal grains of a carbide represented by a compositional formula (VW)C, containing vanadium and tungsten. As shown in FIG. 2, the second microstructure C2 has undergone spinodal decomposition. In fact, as shown in FIG. 2, the entirety of the second microstructure C2 has undergone spinodal decomposition. In the present embodiment, whether or not the ceramic sintered body forming the electrode tip 1 includes a plurality of microstructures, and whether or not one of the plurality of microstructures forms a solid solution containing at least two or three members of the first particular element are determined through X-ray diffractometry by means of an X-ray diffractometer. Specifically, in a crystal structure analysis of the electrode tip 1 through X-ray diffractometry with a CuKα 1 ray within a 2-theta range of 20 degrees to 80 degrees, when two or more peaks attributed to each of <111> orientation, <200> orientation, <220> orientation, <311> orientation, and <222> orientation of the NaCl-type structure are present, or when one or more peaks attributed to an NaCl-type structure and one or more peaks attributed to the hexagonal crystal structure are present, the electrode tip 1 is determined to have a plurality of microstructures. The composition of any microstructure present in the ceramic sintered body is determined on the basis of cross-sectional SEM image or through combinatory analysis of a cross-sectional SEM image with energy dispersive X-ray spectrometry (EDS). Whether or not one of the plurality of microstructures present in the ceramic sintered body serving as the electrode tip 1 has undergone spinodal decomposition is determined on the basis of a cross-sectional SEM image as shown in FIG. 2 with small angle X-ray scattering measurement.

The ceramic sintered body employed in the electrode tip 1 of this example embodiment contains yttrium as the second particular element. The ceramic sintered body employed in the electrode tip 1 contains yttrium in an amount of 3,000 at. ppm or less; e.g., 145 at. ppm.

The ceramic sintered body employed in the electrode tip 1 of the present embodiment contains, as an avoidable impurity, elemental iron. The ceramic sintered body of the electrode tip 1 contains elemental iron (Fe) in an amount of 800 at. ppm or less; e.g., 537 at. ppm. Notably, the amount of elemental iron contained in the ceramic sintered body of the electrode tip 1 may be 0 at. ppm.

In the ceramic sintered body employed in the electrode tip 1 of this example embodiment, the difference in first particular element atomic concentration between individual elements is 1.33 at % and thus smaller than 5 at %. Under such conditions, formation of a solid solution is facilitated in the first microstructure C1 and makes it easier for lattice distortions to occur. These inhibit crystal grain growth, which leads to denser sintered body. In the present embodiment, the difference in first particular element atomic concentration between individual elements is determined on the basis of the calculated compositional proportions in crystal grains through energy dispersive X-ray spectrometry.

The tip-supporting portion 2 is a bottomed tubular member and may be formed by, for example, working a copper rod member. The bottom portion 2a of the tip-supporting portion 2 is provided with a hole 2b in which the electrode tip 1 is to be inserted. Fabrication of the plasma-generating electrode 10 of the present embodiment is completed by embedding the electrode tip 1 in the hole 2b of the tip-supporting portion 2.

Next, an example method for producing the electrode tip 1 of this example embodiment will be described.

In the electrode tip 1 production method, firstly, vanadium carbide powder (mean particle size: 1.8 micrometers), zirconium carbide powder (mean particle size: 2.4 micrometers), niobium carbide powder (mean particle size: 1.1 micrometers), hafnium carbide powder (mean particle size: 0.7 micrometers), and tungsten carbide powder (mean particle size: 1.1 micrometers) are weighed so that the amount of each component is adjusted to 20 mol % in the ceramic sintered body. The thus-weighed metal component powders are each put into a ball mill with acetone (solvent) and pulverized for 10 hours in a circulatory manner. A specific amount of each of the five slurries obtained through pulverization by means of a ball mill was put into a ball mill, and the components are mixed. Subsequently, 0.4 wt % of zirconia partially stabilized with 3 mol % yttria ($Y_2O_3$) (hereinafter referred to as "3YSZ", mean particle size: 1.0 micrometer) is added thereto, and the mixture is sufficiently mixed for 8 hours by means of a ball mill, to thereby prepare a mixture slurry. The thus-prepared mixture slurry is put into a vacuum apparatus equipped with a heating means. The slurry is dried under reduced pressure with heating at 60 degrees Celsius, to thereby yield a dry powder. The thus-prepared dry powder is passed through a sieve (opening: 100 micrometers), to thereby form a granulated powder. A specific amount of the granulated powder is put into a hot-press mold, and fired in vacuum at a firing temperature of 1,800 degrees Celsius and a firing pressure of 60 MPa (HP method). Thus, fabrication of the electrode tip 1 is completed.

Next will be described a test for evaluating the ceramic sintered body serving as an electrode tip for use in a plasma-generating electrode. In the evaluation test, a plurality of ceramic sintered bodies are fabricated under different conditions. The effects of fabrication conditions on the characteristics of the ceramic sintered body are assessed.

Figure 3:
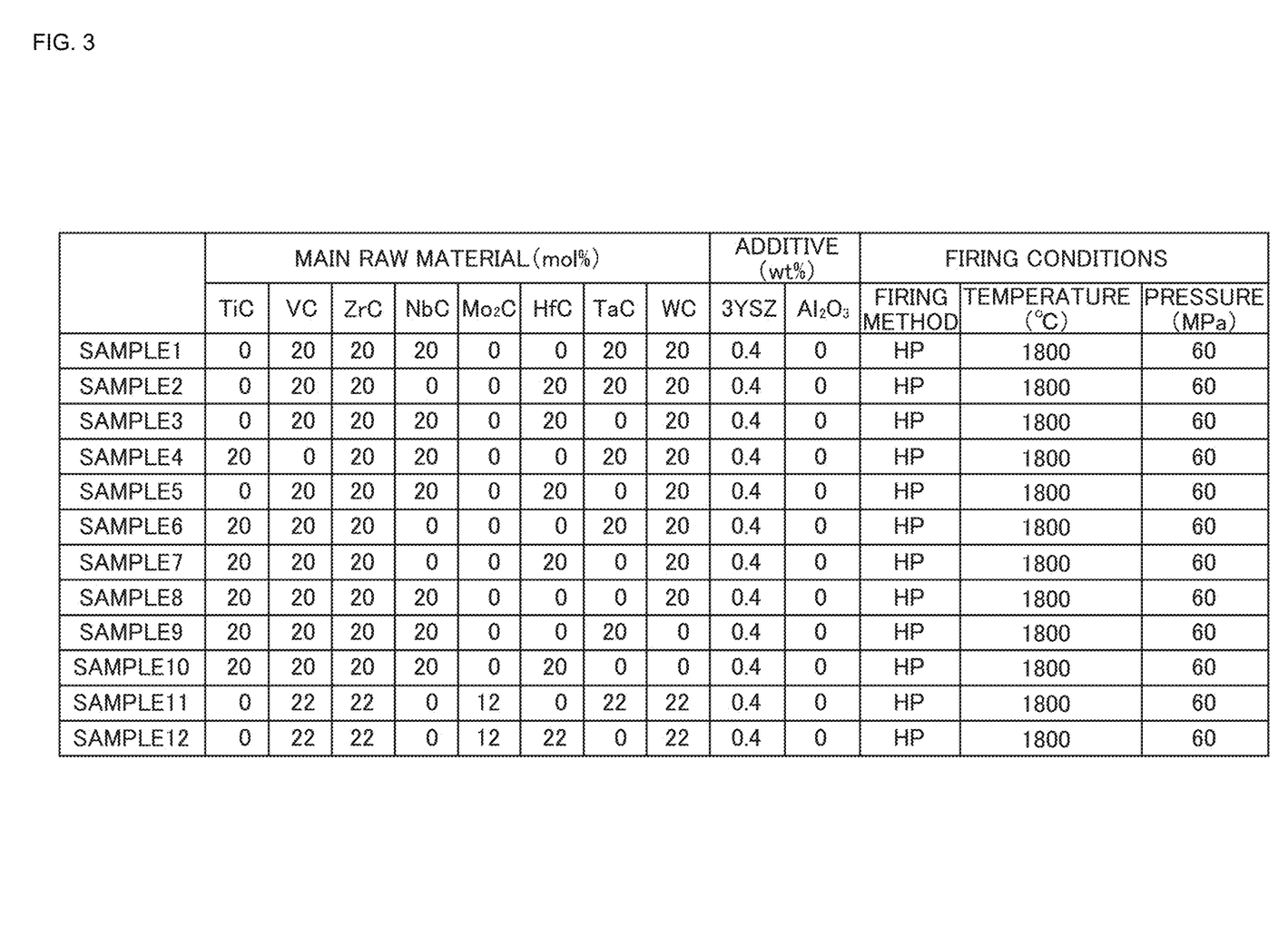
FIG. 3 is a first table showing conditions for fabricating samples of the ceramic sintered body.
Figure 4:
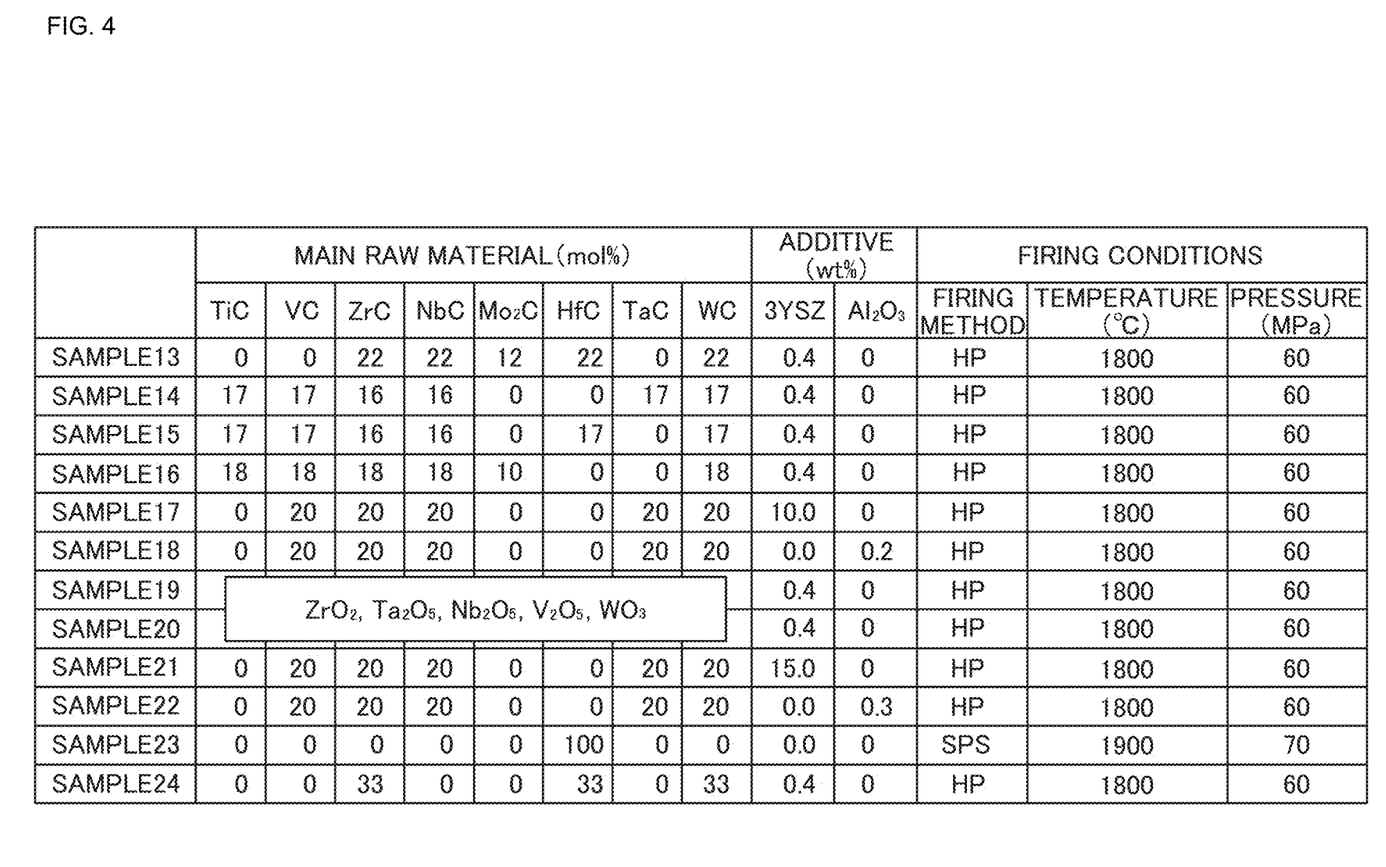
FIG. 4 is a second table showing conditions for fabricating samples of the ceramic sintered body.

FIG. 3 is a first table showing conditions for fabricating samples of the ceramic sintered body. FIG. 4 is a second table showing conditions for fabricating samples of the ceramic sintered body. In the evaluation test, 24 samples of the ceramic sintered body; i.e., samples 1 to 24 were fabricated. FIGS. 3 and 4 show fabrication conditions for samples 1 to 24, individually. The conditions are "main raw material (type and mol %)," "additive (type and wt %)," and "firing conditions" including "firing technique," "temperature (unit: degree Celsius)," and "pressure (unit: MPa)."

Firstly, the "main raw material" for providing the first particular element contained in the ceramic sintered body will be described. As shown in FIGS. 3 and 4, among samples 1 to 24, samples 1 to 18, 21, and 22 were fabricated from 5 to 6 members of titanium carbide, vanadium carbide, zirconium carbide, niobium carbide, molybdenum carbide, hafnium carbide, tantalum carbide, and tungsten carbide, each of which is a "main raw material." In preparation of samples 1 to 18, 21, and 22, the following powders of "main raw material" having the following mean particle sizes were used.

Titanium carbide powder: 1.7 micrometers
Vanadium carbide powder: 1.8 micrometers
Zirconium carbide powder: 2.4 micrometers
Niobium carbide powder: 1.1 micrometers
Molybdenum carbide powder: 1.8 micrometers
Hafnium carbide powder: 0.7 micrometers
Tantalum carbide powder: 1.0 micrometer
Tungsten carbide powder: 1.1 micrometers Next, the "additive" for providing the second particular element contained in the ceramic sintered body will be described. As shown in FIGS. 3 and 4, in fabrication of samples 1 to 18, 21, and 22, 3YSZ or aluminum oxide ($Al_2O_3$) was used as an "additive." In preparation of samples 1 to 18, 21, and 22, the following powders of "additive" having the following mean particle sizes were used.

3YSZ: 1.0 micrometer
$Al_2O_3$: micrometers

Similar to the method for fabricating the electrode tip 1, in preparation of samples 1 to 18, 21, and 22, materials were weighed so as to adjust the values (mol %) of "main raw material" to those shown in FIGS. 3 and 4. The weighed metallic powders were put into a bead mill with acetone (solvent) and pulverized for 10 hours in a circulatory manner. Each of the 5-component or 6-component slurries obtained through pulverization by means of a bead mill was taken in a specific amount and put into a ball mill. The slurries were mixed. Subsequently, "additive" was added to the mixed slurry so as to adjust the values (wt %) to those shown in FIGS. 3 and 4, and mixing was continued for 8 hours by means of a ball mill, to thereby yield a mixed slurry. The thus-yielded mixed slurry was put into a vacuum apparatus equipped with a heating means. The slurry was dried under reduced pressure with heating at 60 degree Celsius, to thereby yield a dry powder. The thus-prepared dry powder was passed through a sieve (opening: 100 micrometers), to thereby form a granulated powder. A specific amount of the granulated powder was put into a hot-press mold, and fired under specific conditions (firing temperature: 1,800 degrees Celsius, firing pressure: 60 MPa, and treatment atmosphere: vacuum), to thereby yield samples 1 to 18, 21, and 22.

In preparation of samples 19 and 20, materials of the plurality of metal oxides and a carbon material were weighed so as to attain the same compositional proportions as those of sample 1. Specifically, in the case of sample 19, materials of the plurality of metal oxides and carbon material were weighed so that the ratio of total metal elements (ME) to carbon (C) ME:C was adjusted to 0.6:0.4. In the case of sample 20, materials of the plurality of metal oxides and carbon material were weighed so that the ratio of total metal elements (ME) to carbon (C) ME:C was adjusted to 0.4:0.6. In preparation of samples 19 and 20, the weighed metal oxide raw materials and a carbon material were mixed by means of a ball mill, to thereby prepare a powder. The powder was subjected to a heat treatment under specific conditions (treatment temperature: 1,600 degrees Celsius, treatment time: 3 hours, and treatment atmosphere: vacuum). After the heat treatment, a specific amount of the powder was put into a hot-press mold, and fired under specific conditions (firing temperature: 1,800 degrees Celsius, firing pressure: 60 MPa, and treatment atmosphere: vacuum), to thereby yield samples 19 and 20. As metal oxide raw material, there were used zirconium oxide ($ZrO_2$), tantalum oxide ($Ta_2O$), niobium oxide ($Nb_2O_5$), vanadium oxide ($V_2O_5$), and tungsten oxide ($WO_3$), and carbon (C). In preparation of samples 19 and 20, the following material powders having the following mean particle sizes were used.

zirconium oxide powder: 1.0 micrometer
tantalum oxide powder: 3.0 micrometers
niobium oxide powder: 1.0 micrometer
vanadium oxide powder: 5.0 micrometers
tungsten oxide powder: 0.7 micrometers
carbon powder: 5.0 micrometers Sample 23 was fabricated by subjecting a single phase sintered body of HfC to spark plasma sintering (SPS). In a specific manner, a hafnium carbide powder (mean particle size: 0.7 micrometers) was put into a square SPS mold (35×35 mm) so as to adjust the thickness of a ceramic sintered body to 5 mm, and fired under specific conditions (firing temperature: 1,900 degrees Celsius, firing pressure: 70 MPa, and treatment atmosphere: vacuum), to thereby yield sample 23.

Sample 24 was fabricated by use of, as "main raw materials," zirconium carbide (mean particle size: 2.4 micrometers), hafnium carbide (mean particle size: 0.7 micrometers), and tantalum carbide (mean particle size: 1.0 micrometer). Sample 24 was prepared in a manner similar to that employed in preparation of samples 1 to 18, 21, and 22. In the evaluation test, samples 1 to 24 fabricated in the aforementioned manner were cut into pieces (3×4×35 mm), and the pieces were tested.

Figure 5:
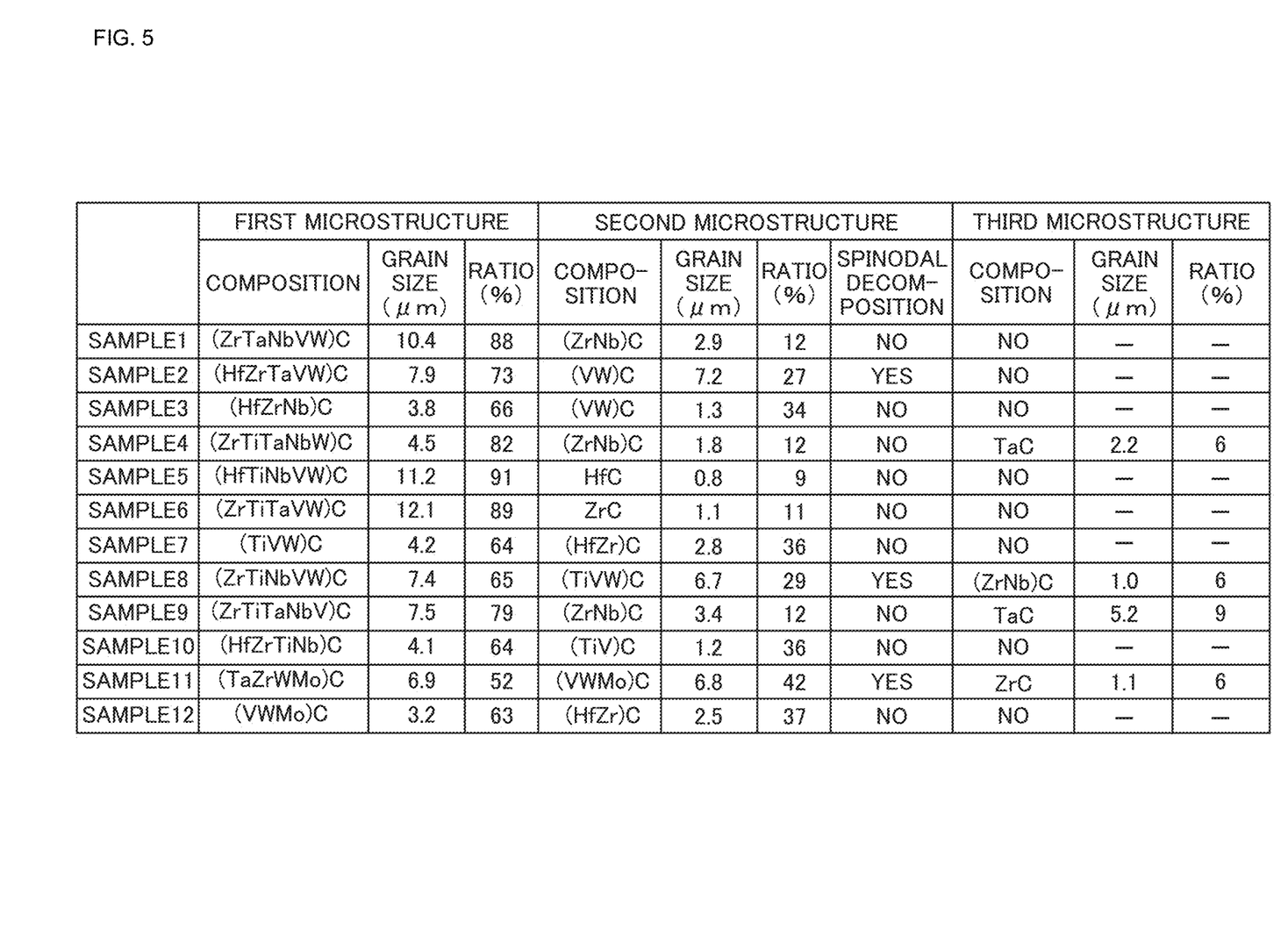
FIG. 5 is a first table showing characteristics of a sample of the ceramic sintered body.
Figure 6:
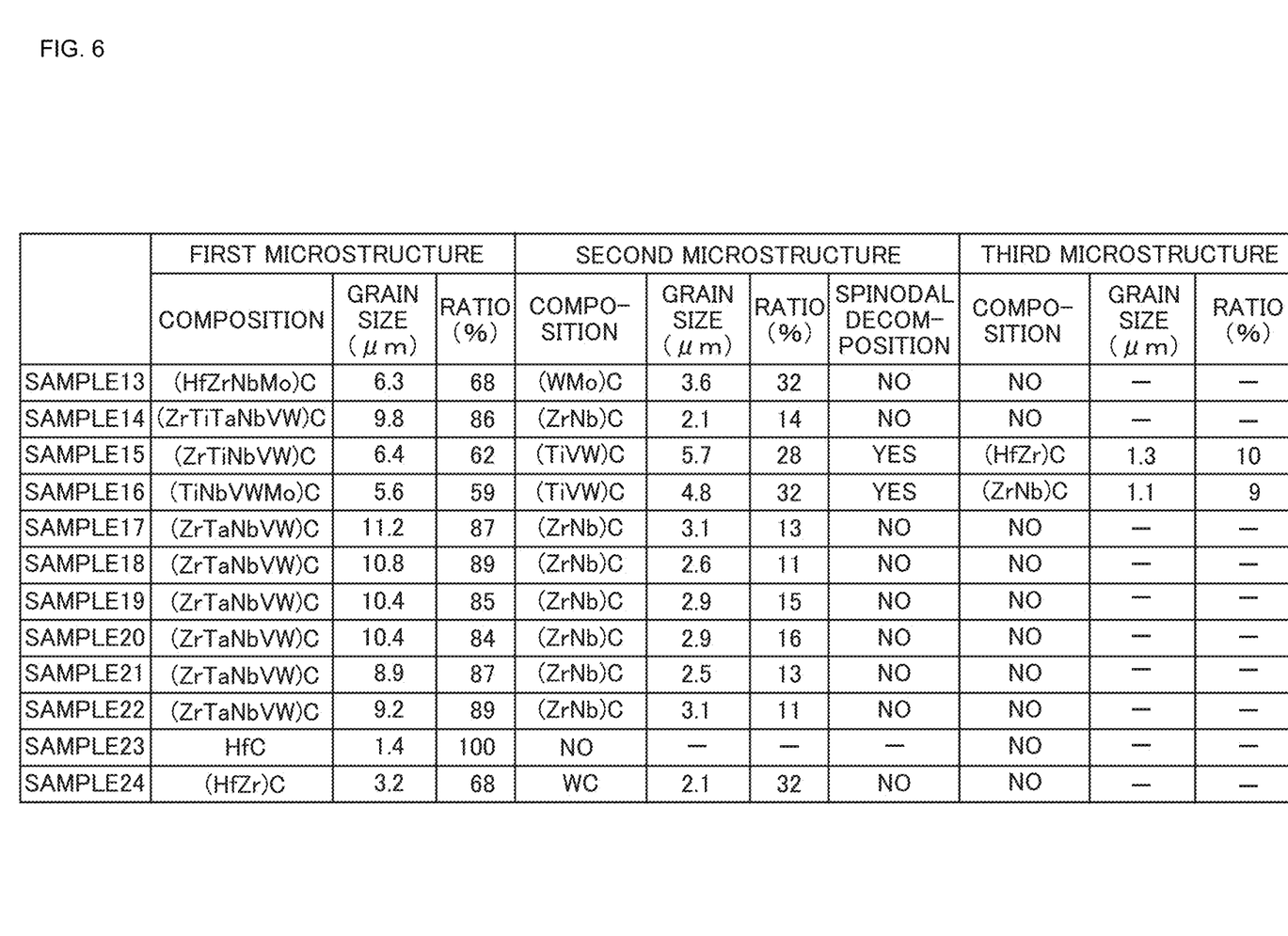
FIG. 6 is a second table showing characteristics of a sample of the ceramic sintered body.

FIG. 5 is a first table showing characteristics of a sample of the ceramic sintered body (Samples 1-12). FIG. 6 is a second table showing characteristics of a sample of the ceramic sintered body (Samples 13-24). FIGS. 5 and 6 show "composition," "grain size," and "content" of each of the microstructures (2 or 3) included in samples 1 to 24.

The "composition" shown in FIGS. 5 and 6 was determined in a manner similar to the case of the ceramic sintered body employed in the electrode tip 1 of the present embodiment. Specifically, a sample was subjected to a thermal etching treatment, and a cross-sectional SEM image of the sample was taken. The image was subjected to energy dispersive X-ray spectroscopy, to thereby determined the composition of a microstructure (crystal grains). The "grain size" shown in FIGS. 5 and 6 was a mean grain size of a microstructure. The mean grain size was determined through the following procedure. Specifically, a sample which had been subjected to the below-mentioned strength test was mirror-polished with diamond abrasive grains. The thus-treated sample was subjected to a thermal etching treatment under specific conditions (treatment atmosphere: vacuum, treatment temperature: 1,800 degrees Celsius, and treatment time: 5 minutes). The sample was imaged under a scanning electron microscope. The particle size was obtained from a secondary electron image (×2,000) taken under the electron microscope through an intercept method. The term "spinodal decomposition" in the column of "second microstructure" denotes whether or not the second microstructure has undergone spinodal decomposition. Whether or not the second microstructure has undergone spinodal decomposition was determined through n the following procedure. Similar to the ceramic sintered body employed in the electrode tip 1 of the present embodiment, the second microstructure present in each sample was identified through observation of a cross-sectional SEM image and measurement of small-angle X-ray scattering. The "content" shown in FIGS. 5 and 6 was a value obtained by determining the "composition" in a taken cross-sectional SEM image and calculating the ratio of the area of each microstructure present the cross-sectional SEM image to the area of the SEM image.

Figure 7:
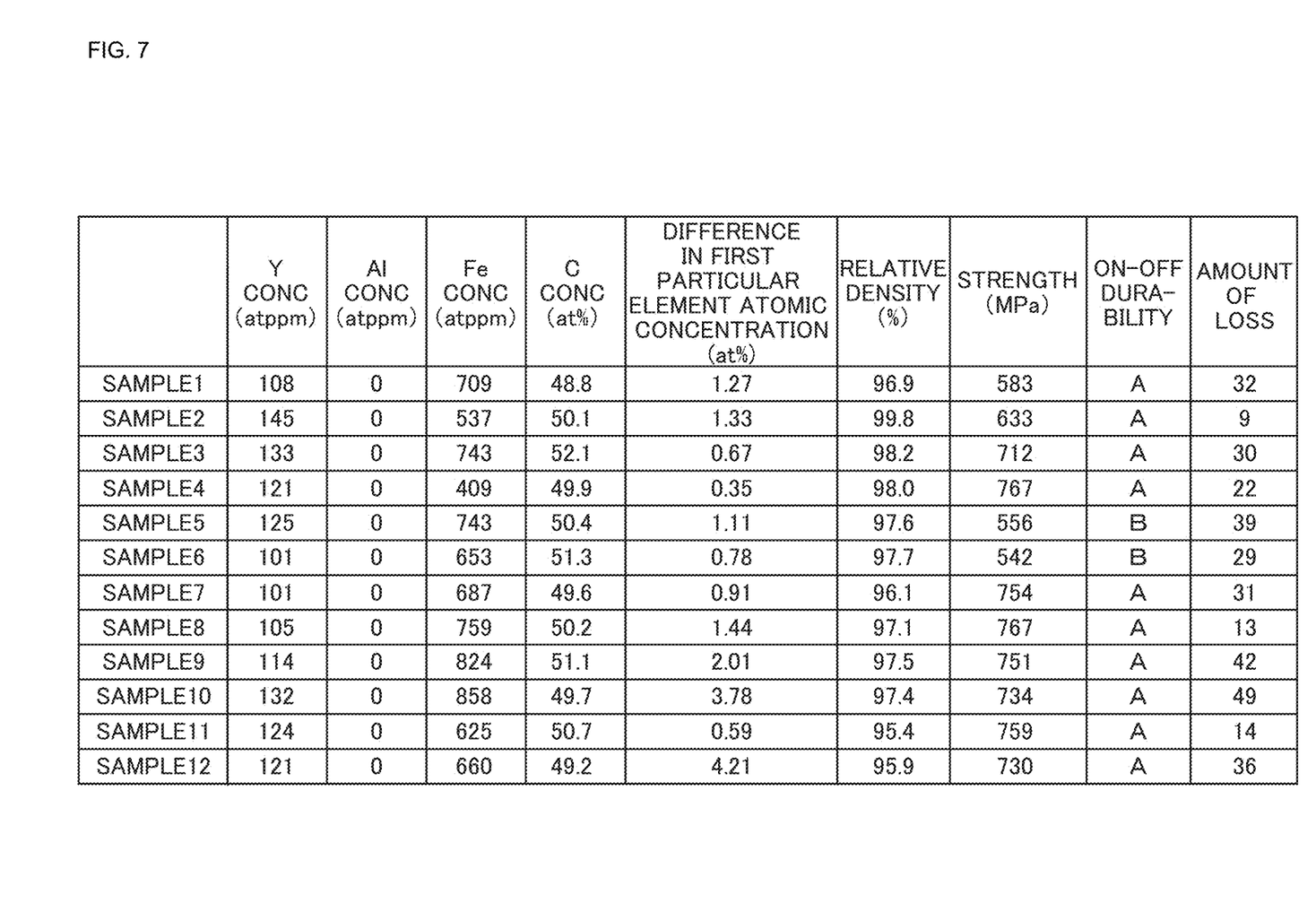
FIG. 7 is a third table showing characteristics of a sample of the ceramic sintered body.
Figure 8:
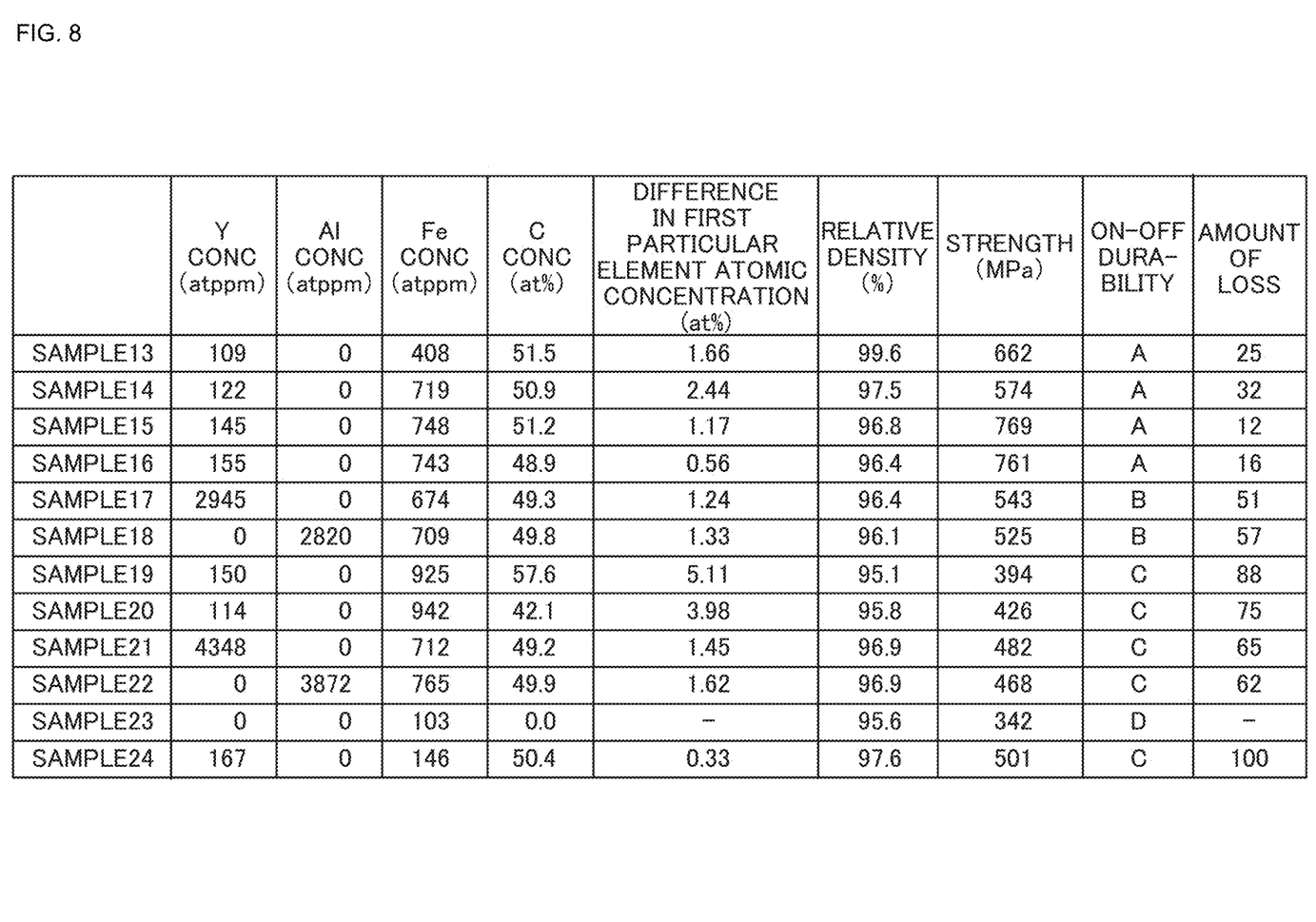
FIG. 8 is a fourth table showing characteristics of a sample of the ceramic sintered body.

FIG. 7 is a third table showing characteristics of a sample of the ceramic sintered body (Samples 1-12). FIG. 8 is a fourth table showing characteristics of a sample of the ceramic sintered body (Samples 13-24). FIGS. 7 and 8 show "Y concentration," "Al concentration," "Fe concentration," "C concentration," "atomic concentration difference in first particular elements," "relative density," "strength," "on-off durability," and "amount of loss" in each of samples 1 to 24.

The "Y concentration," "Al concentration," "Fe concentration," and "C concentration" shown in FIGS. 7 and 8 represent yttrium element concentration, aluminum element concentration, elemental iron concentration, and elemental carbon concentration of each sample. In the evaluation test, a sample which had been subjected to a thermal etching treatment was imaged under an SEM, and a taken cross-sectional SEM image (×500) was subjected to quantitation through energy-dispersive X-ray spectrometry (EDS), to thereby determine "Y concentration," "Al concentration," "Fe concentration," and "C concentration."

The atomic concentration "difference" in first particular elements shown in FIGS. 7 and 8 represents the difference in first particular element atomic concentration between individual elements contained in each sample. The atomic concentration "difference" in first particular elements was calculated from a first particular element concentration as determined through quantitation through energy-dispersive X-ray spectrometry.

The "relative density" shown in FIGS. 7 and 8 represents the density of a ceramic sintered body. The "relative density" of each sample was calculated from specific gravity and open pore ratio of the sample determined in accordance with JIS R1634, and specific gravity of a mixture of carbide powders employed in preparation of the sample. The specific gravity of a mixture of carbide powders employed in preparation of the sample was calculated from the specific gravity of each carbide powder weighed in preparation of the sample, and the ratio of mixing in the sample. The "strength" refers to a value as determined through a 3-point bend test (JIS R1601) of a sample.

The "on-off durability" shown in FIGS. 7 and 8 represents resistance to breakage of a sample under repeated on-off application of electricity; i.e., durability to thermal stress. In the evaluation test, firstly, a ceramic sintered body was formed into a sample (phi:1 mm×L:10 mm), to thereby provide an electrode for evaluation. The thus-formed evaluation electrode was employed as a cathode, and an anode was grounded. While the cathode was connected to a DC pulse power source, plasma test (evoking electric discharge in a nitrogen-oxygen gas mixture) was conducted (power: 200 W, on-off cycle: discharge for 1 minute, and discharge stop for 10 seconds). In the plasma test, the cumulative time to breakage of the sample was categorized to "A," "B," "C," and "D." After the plasma test was conducted for a predetermined time, the broken state of the sample was visually confirmed.

A: No breakage after a cumulative time of 5 hours or longer.
B: Breakage after a cumulative time of 3 hours or longer and shorter than 5 hours.
C: Breakage after a cumulative time of 30 minutes or longer and shorter than 3 hours.
D: Breakage after a cumulative time shorter than 30 minutes.

The "amount of loss" shown in FIGS. 7 and 8 represents the amount of loss of a ceramic sintered body sample when used as a plasma-generating electrode; i.e., resistance to loss (consumption). The "amount of loss" is a value calculated from a weight loss of an electrode for evaluation after the aforementioned plasma test. The "amount of loss" is a relative value with respect to the "amount of loss" of sample 24 as 100. That is, the smaller the value, the smaller the amount of loss.

As shown in FIGS. 3 and 4, each of samples 1 to 22 contains a first particular element consisting of five or six elements selected from among titanium, vanadium, zirconium, niobium, molybdenum, hafnium, tantalum, and tungsten; a second particular element consisting of one element selected from yttrium and aluminum; and elemental carbon. Also, each of samples 1 to 22 contains the first particular element, the second particular element, and elemental carbon in a total amount of 98 at % or more. As shown in FIGS. 5 and 6, the first microstructure and the second microstructure have compositions different from each other. In the first microstructure present in samples 1 to 22, a solid solution containing three or more elements among the first particular elements is formed.

Samples 1 to 22 were found to exhibit a "relative density" equal to or greater than that of sample 23 single phase sintered body of HfC). Also, samples 1 to 22 were found to exhibit a "strength" and an "on-off durability" greater than those of sample 23. Yet also, samples 1 to 22 were found to exhibit an "amount of loss" smaller than that of sample 24, in which the first microstructure was a solid solution containing two elements. These test results have revealed that samples 1 to 22 each were a ceramic sintered body having a density equal to or higher than that of sample 23, to thereby improve mechanical strength, whereby durability to thermal stress was enhanced as compared with that of sample 23, and resistance to loss was improved as compared with that of sample 24.

Sample 23, containing hafnium carbide, was fabricated through spark plasma sintering (SPS). However, samples 1 to 22, containing an element having a melting point lower than that of hafnium carbide, were found to yield a dense ceramic sintered body even through hot pressing (HP).

Regarding samples 1 to 22, and sample 24, the first particular element that can form two or more microstructures from the first microstructure and the second microstructure is chosen as a main raw material. Thus, growth of crystal grains is suppressed in each of the two or more microstructures, whereby ceramic sintered body having a relatively high mechanical strength can be fabricated.

In samples 1 to 22, the "first microstructure" included a solid solution containing at least three members of the first particular element. Thus, a ceramic sintered body resistant to loss can be fabricated, even when heat generation occurs upon passage of electricity. Notably, when the crystal grains contain more types of ingredients, the amount of loss attributed to generation of plasma at high temperature decreases.

Among samples 1 to 16, samples 2, 8, 11, 15, and 16 were found to exhibit a relatively small "amount of loss," which were smaller than 20. Samples 2, 8, 11, 15, and 16 have a "second microstructure" which has undergone spinodal decomposition. Since the "second microstructure" has undergone spinodal decomposition, electric resistance between microstructures (i.e., crystal grain boundary) decreases, whereby heat generation due to passage of electricity is suppressed. As a result, loss attributable to heat generation can be suppressed.

Regarding the "strength" of samples 1 to 16, samples 1 to 4, and samples 7 to 16, in which the "second microstructure" included a solid solution containing two or more members of the first particular element, were found to exhibit a "strength" greater than those of samples 5 and 6, in which the "second microstructure" included a solid solution containing one member of the first particular element. In samples 1 to 4, and samples 7 to 16, the "second microstructure" included a solid solution containing two or more members of the first particular element. Since the "second microstructure" included a solid solution containing two or more members of the first particular element, grain growth is suppressed in the "first microstructure." Thus, a ceramic sintered body having high mechanical strength can be fabricated. Notably, when the crystal grains in the "second microstructure" contain more types of ingredients, growth of crystal grains in the "first microstructure" can be suppressed more effectively. As a result, the mechanical strength can be further enhanced.

Regarding the "strength" of samples 1 to 18, 21, and 22, samples 1 to 18, which had a "Y concentration" or an "Al concentration" of 3,000 ppm or less, were found to exhibit a mechanical strength more excellent than that of sample 21 or 22, which had a "Y concentration" or an "Al concentration" more than 3,000 ppm. Since samples 21 and 22 had a "Y concentration" or an "Al concentration" more than 3,000 ppm, densification of the ceramic sintered body is impeded, to thereby facilitate provision of pores between microstructures. Thus, samples 21 and 22 have poor mechanical strength, readily causing breakage. In contrast, samples 1 to 18, which had a "Y concentration" or an "Al concentration" of 3,000 ppm or less, provision of pores between microstructures is prevented, whereby a mechanical strength higher than a specific level can be secured.

Regarding the "strength" of samples 1 to 20, samples 1 to 18, having an elemental carbon concentration of 45 at % or higher and 55 at % or lower, were found to exhibit a mechanical strength greater than that of sample 19, having an elemental carbon concentration higher than 55 at %, and that of sample 20, having an elemental carbon concentration lower than 45 at %. When the elemental carbon concentration of a ceramic sintered body is higher than 55 at %, free carbon is deposited. Free carbon emerges between microstructures as a fragile phase, resulting in a drop in mechanical strength of the ceramic sintered body. When the elemental carbon concentration of a ceramic sintered body is lower than 45 at %, a metal component present in the second microstructure is deposited as a metal phase. Since the thus-deposited metal phase has a melting point lower than that of a metal carbide, durability of the ceramic sintered body at high temperature decreases. In contrast, when the elemental carbon concentration of a ceramic sintered body is 45 at % or higher and 55 at % or lower, both generation of free carbon and deposition of a metal phase can be suppressed.

Regarding the "amount of loss" of samples 1 to 16, samples 1 to 8, and 11 to 16, having an elemental iron concentration of 800 at. ppm or lower, were found to exhibit an amount of loss lower than that of samples 9 and 10 (lower than 40), having an elemental iron concentration higher than 800 at. ppm. The ceramic sintered body contained elemental iron as an impurity. When the elemental iron concentration exceeds 800 at. ppm, iron-based relatively large grains are deposited. Since such iron-based grains have a low melting point, durability of the ceramic sintered body at high temperature decreases. In contrast, when the elemental iron concentration of a ceramic sintered body is 800 at. ppm or lower, deposition of iron-based grains can be suppressed.

In an apparatus employing plasma such as a plasma cutting machine or a plasma surface-treatment device, in some cases, the plasma-generating electrode is formed of a high melting metallic material such as hafnium carbide. However, since hafnium carbide can be difficultly sintered, difficulty is encountered in yielding a dense ceramic sintered body. Thus, a ceramic sintered body formed from hafnium carbide can be formed only through spark plasma sintering. In one mode of the spark plasma sintering technique, electrodes are attached to respective ends of a columnar ceramic compact, and high voltage is applied, to thereby complete sintering of the ceramic sinter body. In order to fabricate a relatively large ceramic sintered body, application of relatively large voltage is required, resulting an increase in apparatus and production costs. In addition, in spark plasma sintering, difficulty is encountered in achieving uniform sintering of a thick ceramic compact, and flexibility to shape is limited. Furthermore, even when a relatively dense ceramic sintered body can be successfully fabricated from hafnium carbide, micropores are present in the crystal grain boundary. Thus, the mechanical strength of the ceramic sintered body is relatively low. In the case where a ceramic sintered body having low mechanical strength is employed as an electrode tip of a plasma-generating electrode, the ceramic sintered body formed of hafnium carbide is broken by thermal stress attributed to repeated on-off operations, when generation of plasma and stoppage thereof are repeated.

As described herein above, the ceramic sintered body employed in the electrode tip 1 of the present embodiment contains a first particular element consisting of five or six elements selected from among titanium, vanadium, zirconium, niobium, molybdenum, hafnium, tantalum, and tungsten; a second particular element; and elemental carbon in a total amount of 98 at % or more. Among a plurality of microstructures present in the ceramic sintered body, the first microstructure C1 includes a solid solution containing at least three members of the first particular element. Since the solid solution containing at least three members of the first particular element includes an element having a melting point lower than that of hafnium carbide, a dense ceramic sintered body can be fabricated even through a technique of, for example, hot pressing (HP). Thus, the mechanical strength of the ceramic sintered body is enhanced, and durability of the sintered body to thermal stress can be enhanced.

According to the ceramic sintered body employed in the electrode tip 1 of the present embodiment, the first microstructure C1 includes a solid solution containing at least three members of the first particular element. Thus, loss of the ceramic sintered body itself due to heat generation during passage of electricity can be suppressed.

According to the ceramic sintered body employed in the electrode tip 1 of the present embodiment, the second microstructure C2 has undergone spinodal decomposition. Thus, electric resistance between microstructures decreases, to thereby suppress heat generation of the ceramic sintered body. As a result, loss of the ceramic sintered body due to heat generation can be suppressed.

According to the ceramic sintered body employed in the electrode tip 1 of the present embodiment, the second microstructure C2 includes a solid solution containing at least two members of the first particular element. Thus, the density of the ceramic sintered body is further enhanced, whereby the mechanical strength of the ceramic sintered body can be further enhanced.

According to the ceramic sintered body employed in the electrode tip 1 of the present embodiment, the member of the first particular element is chosen so that the composition of the first microstructure C1 is different from that of the second microstructure C2. Thus, growth of crystal grains in the first microstructure C1 and those in the second microstructure C2 is suppressed, whereby a ceramic sintered body having further enhanced mechanical strength can be yielded.

According to the ceramic sintered body employed in the electrode tip 1 of the present embodiment, the second particular element concentration of the ceramic sintered body is 3,000 at. ppm or lower, to thereby suppress provision of pores between microstructures. Thus, the density of the ceramic sintered body is further enhanced, whereby the mechanical strength of the ceramic sintered body can be further enhanced.

According to the ceramic sintered body employed in the electrode tip 1 of the present embodiment, the ceramic sintered body contains elemental carbon in an amount of 45 at % or more and 55 at % or less. As a result, deposition of free carbon can be suppressed, while a metal phase originating from the first particular element can be suppressed. Thus, the mechanical strength of the ceramic sintered body can be further enhanced.

According to the ceramic sintered body employed in the electrode tip 1 of the present embodiment, the ceramic sintered body has an elemental iron concentration of 800 at. ppm or lower. As a result, deposition of iron-based grains is suppressed. Thus, melting of the ceramic sintered body due to a rise in temperature is suppressed, whereby undesired loss of the ceramic sintered body possibly due to heat generation can be further suppressed.

According to the plasma-generating electrode 10 of the present embodiment, the plasma-generating electrode has a ceramic sintered body which includes the first microstructure C1, corresponding to a solid solution containing at least three members of the first particular element. Thus, durability of the plasma-generating electrode to thermal stress can be enhanced, whereby service life of the plasma-generating electrode can be prolonged.

Modification Examples of the Present Embodiment

The present disclosure is not limited to the above-described embodiment and can be implemented in various forms without departing from the gist of the present disclosure. For example, the following modifications are possible.

Modification 1

In the aforementioned example embodiment, the ceramic sintered body employed in the electrode tip 1 contains, as the first particular element, five elements; i.e., hafnium, zirconium, tantalum, vanadium, and tungsten. However, as described herein above, the ceramic sintered body present may contain five or six elements from among titanium, vanadium, zirconium, niobium, molybdenum, hafnium, tantalum, and tungsten.

Modification 2

In the aforementioned example embodiment, the second microstructure C2 present in the ceramic sintered body has undergone spinodal decomposition over the entirety of the microstructure. Although a plurality of microstructures present in the ceramic sintered body has not necessarily undergone spinodal decomposition, spinodal decomposition of a microstructure reduces electrical resistance between microstructures. As a result, heat generation of the ceramic sintered body can be suppressed.

Modification 3

In the aforementioned example embodiment, the second microstructure C2 is formed of crystal grains containing vanadium and tungsten and represented by a compositional formula (VW)C. The second microstructure C2 assumes a solid solution containing at least two members of the first particular element. A plurality of microstructures present in the ceramic sintered body may not necessarily assume a solid solution containing at least two members of the first particular element. However, when the microstructure assumes a solid solution containing at least two members of the first particular element, the ceramic sintered body is densified, whereby the mechanical strength of the ceramic sintered body can be enhanced.

Modification 4

In the aforementioned example embodiment, the yttrium concentration of the ceramic sintered body employed in the electrode tip 1 is adjusted to 145 at. ppm. Although the yttrium concentration of the ceramic sintered body is not necessarily limited to the above value, the concentration is preferably 3,000 at. ppm or lower. When the yttrium concentration is 3,000 at. ppm or lower, provision of pores between microstructures is suppressed. Thus, the ceramic sintered body is densified, whereby the mechanical strength of the ceramic sintered body can be enhanced. Also, the second particular element contained in the ceramic sintered body may be aluminum. In that case, the aluminum concentration of the ceramic sintered body is preferably 3,000 at. ppm or lower.

Modification 5

In the aforementioned example embodiment, the elemental carbon concentration of the ceramic sintered body employed in the electrode tip 1 is adjusted to 45 at % or higher and 55 at % or lower. Although the elemental carbon concentration of the ceramic sintered body is not necessarily limited to a value falling within the above range, the concentration is preferably 45 at % or higher and 55 at % or lower. When the elemental carbon concentration of the ceramic sintered body is higher than 55 at %, free carbon is deposited. Free carbon emerges between microstructures as a fragile phase, resulting in a drop in mechanical strength of the ceramic sintered body. When the elemental carbon concentration of a ceramic sintered body is lower than 45 at %, a metal component present in the second microstructure is deposited as a metal phase. Since the thus-deposited metal phase has a melting point lower than that of a metal carbide, durability of the ceramic sintered body at high temperature decreases. Thus, when the elemental carbon concentration of a ceramic sintered body is adjusted to 45 at % or higher and 55 at % or lower, both generation of free carbon and deposition of a metal phase can be suppressed.

Modification 6

In the aforementioned example embodiment, the elemental iron (Fe) concentration of the ceramic sintered body employed in the electrode tip 1 is adjusted to 800 at. ppm or lower. The elemental iron concentration may be higher than 800 at. ppm. However, when the elemental iron concentration increases, deposited iron-based grains melt, resulting in short service life. Thus, the elemental iron concentration is preferably lower. The elemental iron concentration may be lower than the detection limit in quantitation through energy-dispersive X-ray spectrometry (EDS).

Modification 7

The ceramic sintered body of the aforementioned embodiment has the electrode tip 1. However, the technical field to which the ceramic sintered body applies is not limited thereto. The ceramic sintered body may be employed in various fields where durability to thermal stress or resistance to loss is required.

The present disclosure has been described above with reference to the specific embodiments and modification example. However, the embodiment of the aforementioned disclosure is provided only for the purpose of easy understanding of the present disclosure, and should not be construed as limiting the disclosure. The present disclosure may be modified or improved, without deviating from the gist and the claims, and encompasses equivalents thereto. In addition, unless a technical feature is referred to as an essential element in the specification, it may be appropriately deleted.

Application Example 1

A ceramic sintered body, which contains
a first particular element consisting of five or six elements selected from among titanium (Ti), vanadium (V), zirconium (Zr), niobium (Nb), molybdenum (Mo), hafnium (Hf), tantalum (Ta), and tungsten (W);
a second particular element consisting of one element selected from yttrium (Y) and aluminum (Al); and
elemental carbon (C), wherein
the total amount of the first particular element, the second particular element, and elemental carbon is 98 at % or more;
the ceramic sintered body has a plurality of microstructures having respective compositions different from one another;
one of the plurality of microstructures includes a solid solution containing at least three members of the first particular element.

Application Example 2

A ceramic sintered body as described in Application Example 1,
wherein another one of the plurality of microstructures has undergone spinodal decomposition.

Application Example 3

A ceramic sintered body as described in Application Example 1 or 2,
wherein another one of the plurality of microstructures includes a solid solution containing at least two members of the first particular element.

Application Example 4

A ceramic sintered body as described in any one of Application Examples 1 to 3,
wherein the ceramic sintered body contains the second particular element in an amount of 3,000 at. ppm or less.

Application Example 5

A ceramic sintered body as described in any one of Application Examples 1 to 4,
wherein the ceramic sintered body contains elemental carbon in an amount of 45 at % or more and 55 at % or less.

Application Example 6

A ceramic sintered body as described in any one of Application Examples 1 to 5, wherein the ceramic sintered body contains elemental iron (Fe) in an amount of 800 at. ppm or less.

Application Example 7

A plasma-generating electrode which has a ceramic sintered body as recited in any one of Application Examples 1 to 6.

The disclosure has been described in detail with reference to the above embodiments. However, the disclosure should not be construed as being limited thereto. It should further be apparent to those skilled in the art that various changes in form and detail of the disclosure as shown and described above may be made. It is intended that such changes be included within the spirit and scope of the claims appended hereto.

This application is based on Japanese Patent Application No. 2024-003706 filed Jan. 15, 2024, the disclosure of which is incorporated herein by reference its entirety.

What is claimed is:

1. A ceramic sintered body, which comprises
a first particular element consisting of five or six elements selected from among the group consisting of titanium (Ti), vanadium (V), zirconium (Zr), niobium (Nb), molybdenum (Mo), hafnium (Hf), tantalum (Ta), and tungsten (W);
a second particular element consisting of one element selected from the group consisting of yttrium (Y) and aluminum (Al); and
elemental carbon (C), wherein
a total amount of the first particular element, the second particular element, and elemental carbon is 98 at % or more;
the ceramic sintered body has a plurality of microstructures having respective compositions different from one another;
one of the plurality of microstructures includes a solid solution containing at least three members of the first particular element.

2. The ceramic sintered body according to claim 1, wherein another one of the plurality of microstructures has undergone spinodal decomposition.

3. The ceramic sintered body according to claim 2, wherein another one of the plurality of microstructures includes a solid solution containing at least two members of the first particular element.

4. The ceramic sintered body according to claim 2, which contains the second particular element in an amount of 3,000 at. ppm or less.

5. The ceramic sintered body according to claim 2, which contains elemental carbon in an amount of 45 at % or more and 55 at % or less.

6. The ceramic sintered body according to claim 2, which contains elemental iron (Fe) in an amount of 800 at. ppm or less.

7. A plasma-generating electrode, comprising:
a ceramic sintered body as recited in claim 2.

8. The ceramic sintered body according to claim 1, wherein another one of the plurality of microstructures includes a solid solution containing at least two members of the first particular element.

9. The ceramic sintered body according to claim 1, which contains the second particular element in an amount of 3,000 at. ppm or less.

10. The ceramic sintered body according to claim 1, which contains elemental carbon in an amount of 45 at % or more and 55 at % or less.

11. The ceramic sintered body according to claim 1, which contains elemental iron (Fe) in an amount of 800 at. ppm or less.

12. A plasma-generating electrode, comprising:
a ceramic sintered body as recited in claim 1.

* * * * *